(12) United States Patent  
Topueth et al.

(10) Patent No.: US 9,057,601 B2  
(45) Date of Patent: Jun. 16, 2015

(54) METHOD OF AND APPARATUS FOR 3-D IMAGING A PIPE

(71) Applicants: Manfred Topueth, Wassenberg (DE); Michael Krauhausen, Aachen (DE); Jochen Vochsen, Erkelenz (DE)

(72) Inventors: Manfred Topueth, Wassenberg (DE); Michael Krauhausen, Aachen (DE); Jochen Vochsen, Erkelenz (DE)

(73) Assignee: SMS MEER GMBH, Moenchengladbach (DE)

( * ) Notice: Subject to any disclaimer, the term of this patent is extended or adjusted under 35 U.S.C. 154(b) by 254 days.

(21) Appl. No.: 13/872,236

(22) Filed: Apr. 29, 2013

(65) Prior Publication Data

US 2013/0283628 A1    Oct. 31, 2013

(30) Foreign Application Priority Data

Apr. 30, 2012   (DE) .................. 10 2012 008 433

(51) Int. Cl.  
*G01B 11/24* (2006.01)  
*G01B 11/245* (2006.01)

(52) U.S. Cl.  
CPC .......... *G01B 11/2408* (2013.01); *G01B 11/245* (2013.01)

(58) Field of Classification Search  
None  
See application file for complete search history.

(56) References Cited

U.S. PATENT DOCUMENTS

| 4,445,276 | A | 5/1984 | Voeneky et al. |
| 4,574,638 | A | 3/1986 | Omae et al. |
| 4,642,902 | A | 2/1987 | Niedermayr |
| 4,993,836 | A | 2/1991 | Furuhashi et al. |
| 6,285,456 | B1 | 9/2001 | Narumi |
| 6,289,600 | B1 | 9/2001 | Watts |
| 6,954,991 | B2 | 10/2005 | Akatsuka |
| 2003/0189713 | A1 | 10/2003 | Lam |

FOREIGN PATENT DOCUMENTS

| DE | 3816130 | A | 11/1989 |
| EP | 7227 | A1 | 1/1980 |
| JP | 10019504 | A | 1/1998 |
| JP | 2001033233 | A | 2/2001 |
| JP | 2007040855 | A | 2/2007 |

*Primary Examiner* — Kara E Geisel  
*Assistant Examiner* — Amanda Merlino  
(74) *Attorney, Agent, or Firm* — Andrew Wilford

(57) ABSTRACT

An apparatus for three-dimensionally imaging a pipe centered on and extending along an axis has supports for supporting the pipe by engagement with only an inside surface of the pipe such that an outer surface of the pipe is entirely exposed. A scanner is spacedly juxtaposed with and around the outer surface of the pipe. The scanner and the pipe can be relatively axially displaced such that the scanner passes along a full length of the pipe for scanning of the entire outer surface.

10 Claims, 3 Drawing Sheets

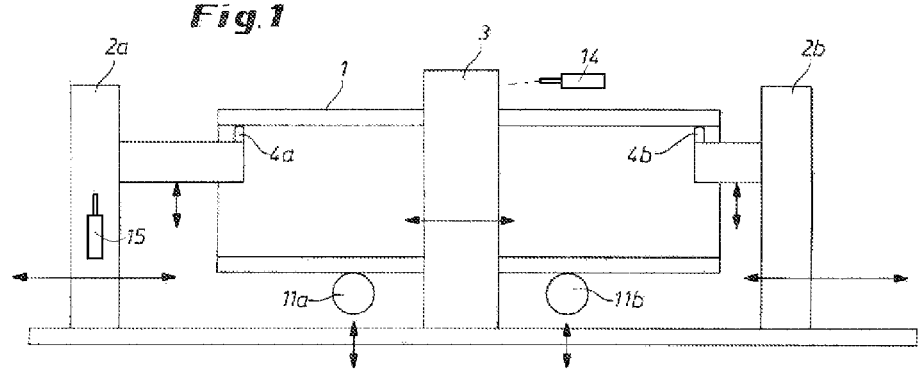
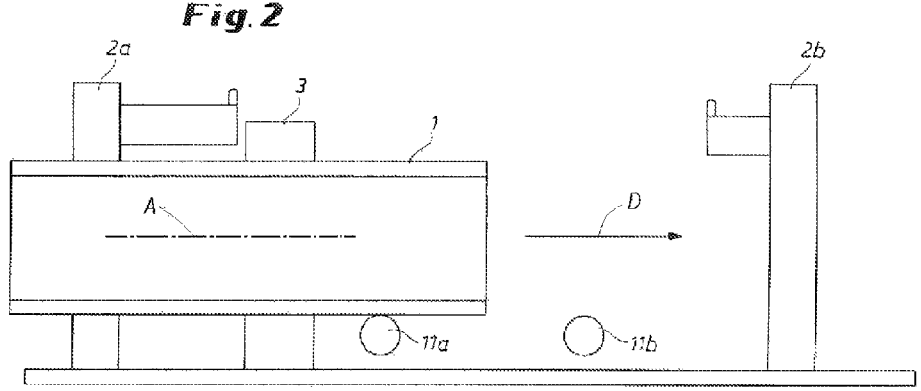

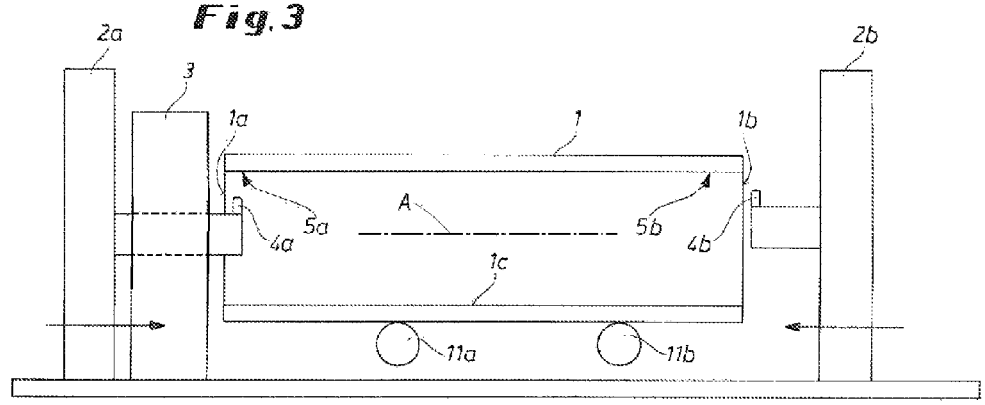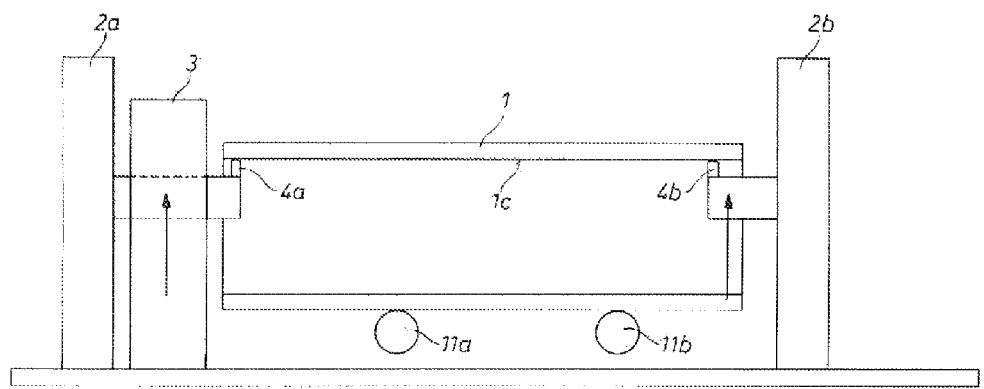

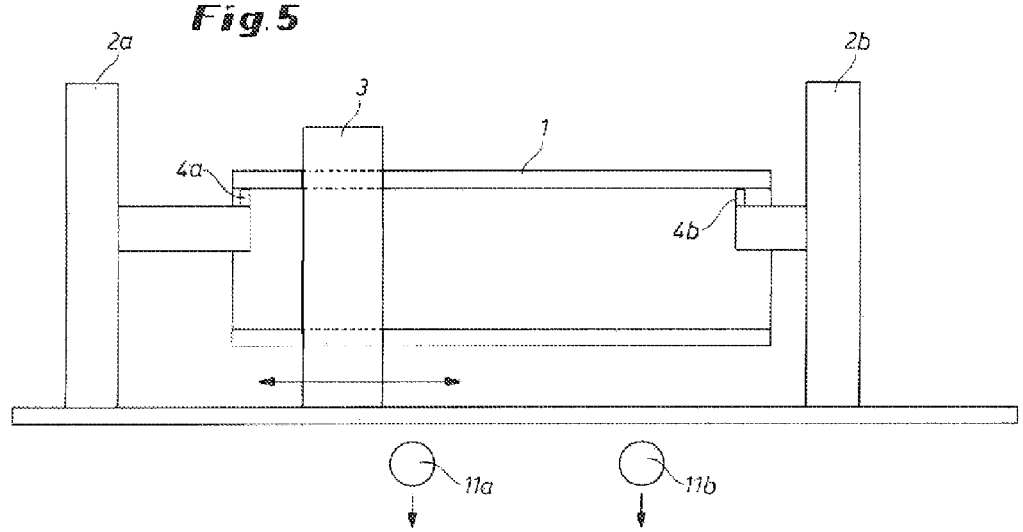
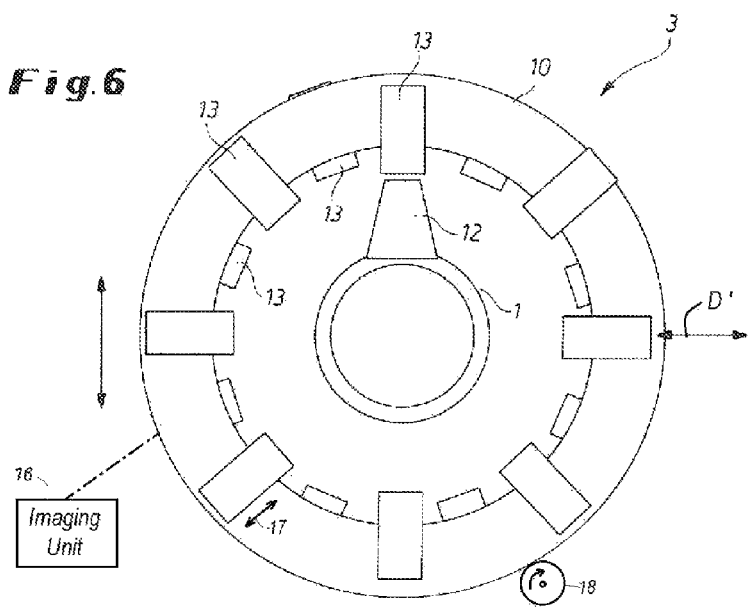

METHOD OF AND APPARATUS FOR 3-D IMAGING A PIPE

FIELD OF THE INVENTION

The present invention relates to a three-dimensional imaging system. More particularly this invention concerns a method of and apparatus for 3D imaging a pipe.

BACKGROUND OF THE INVENTION

Pipes are typically produced from a metal block either by fitting a mandrel through the block and then rolling it out, or by welding a metal sheet that has previously been formed into the desired tubular shape. When pipes of this type are employed, in particular, as pipeline elements for transporting liquid or gaseous media under high pressure, a high priority is placed on the quality and shape accuracy of the pipes.

The quality-specific requirements cover not only the surface quality and the slightest possible deviations from the previously specified wall thickness over the entire length of the pipe, but also the three-dimensional shape of the entire pipe at multiple locations on the two-dimensional shape of the pipe cross-section.

Especially strict requirements must be met in terms of the shape of the pipe over its entire length especially in the case of pipes for pipelines that are laid on the ocean floor and are thus subject at the place of use not only to the specified inside pressures but also to high external pressures. Even small deviations from the desired roundness of the pipe cross-section, known as ovalty, can result in local indentations in the pipe or in problems in welding two pipes together.

The pipe manufacturer must therefore typically ensure that the roundness of the pipe lies within the specified tolerances over its entire length, and thus even far removed from the pipe ends. For this reason, mechanical measuring elements such as calipers or measurement clamps are typically used at the pipe ends to measure the shape of the pipe. The diameter of the pipe is then typically measured at three previously determined measurement points in order to thereby derive information about the roundness or ovalty of the entire pipe between the ends.

However, it is almost impossible, or possible only by expensive means, to determine the complete shape of the pipe over its full length. In addition, when such measurements are made the pipes are lying either in storage or on a conveying roller bed on a limited number of supports that are not always in the same position or orientation, with the result that both any bending of the pipe over its length as well as deformations in the shape of the pipe due to its own weight have a considerable effect on each measurement.

A need therefore exists for a standardized measurement method for determining the contour and shape of these types of pipe, which method is not yet available. There is similarly a need to be able to perform the measurements required for measuring quality and ensuring quality as much as possible automatically, and preferably also in a standardized fashion.

OBJECTS OF THE INVENTION

It is therefore an object of the present invention to provide an improved system for 3D imaging pipe.

Another object is the provision of such an improved system for 3D imaging pipe that overcomes the above-given disadvantages, in particular that determines of the three-dimensional shape of a pipe, preferably by automated means, over its entire length in a reproducible fashion and without any adverse effects to the environment.

SUMMARY OF THE INVENTION

An apparatus for three-dimensionally imaging a pipe centered on and extending along an axis has according to the invention supports for supporting the pipe by engagement with only an inside surface of the pipe such that an outer surface of the pipe is entirely exposed. A scanner is spacedly juxtaposed with and around the outer surface of the pipe. The scanner and the pipe can be relatively axially displaced such that the scanner passes along a full length of the pipe for scanning of the entire outer surface.

According to the invention, any local effects of the environment on the measurement location can be avoided, whether on a roller bed or in storage. According to the invention, the scanning of the pipe shape is done by a contact-free approach, the pipe and the scanner required here effect the contact-free scanning of the pipe shape by relative axial movement over the entire length of the pipe.

This movability of the pipe, on the one hand, and the scanner of the pipe shape, on the other hand, relative to each other can comprise moving the scanner over a resting pipe, moving the pipe relative to a fixed scanner, as well as movement of both components relative to each other. However, one embodiment is preferred in which the pipe-shape scan is done over the entire length of a pipe that is resting only on the holder, thereby avoiding any effects on scanning the pipe due solely to the movement of the pipe.

The method according to the invention accordingly comprises the steps of holding the pipe from the inside and using an appropriate device to effect the contact-free scanning of the pipe shape over the entire length of the pipe, where the pipe on the one hand and the pipe-shape scanner on the other hand are at the same time moved relative to each other over the entire length of the pipe for the scanning procedure.

This provides for the first time a standardizable method for the three-dimensional scanning of an entire pipe. This method provides completely reproducible and verifiable results without the necessity of having to take into account local effects.

In order to effect a standardized scanning of the three-dimensional shape of the pipe, what needs to be defined is only the number of supports supporting the pipe, and the position of the supports on the pipe inner surface, or possibly also the support surface and the position of the weld seam or weld seams of the pipe relative to the support or supports. The fact that the pipe is supported only from the inside for the first time enables scanning of the entire three-dimensional shape of the entire outside surface of the pipe to be effected over its entire length. Optionally, the same operational step can be used, either alternatively or also in combination with another measurement method, to similarly measure the shape of the pipe ends that typically are of a design that is defined in advance to allow the connecting welds to be done.

The invention thus enables a complete three-dimensional shape of the pipe to be scanned without performing multiple measurement operations in discrete steps over the length of the pipe.

In a preferred embodiment of the apparatus according to the invention, the holder includes two supports that engage the respective pipe ends and engage preferably predefined points of the pipe ends. The preferred approach here is for the predefined points of the pipe ends to be located at the Bessel points, where the tolerable range for a pipe length of typically 12.5 to 18 m for pipeline pipes is considered to be deviations of ±25 cm, especially preferably ±5 cm, from the calculated Bessel points. Very much preferred, however, is for the support points to essentially coincide with the Bessel points of the supported pipe, and thus to be located less than 1 cm from these points. The Bessel points describe the optimal positions of the supports of a uniformly loaded beam that bends elastically under its own weight or that of a uniformly distributed load. The Bessel points that should preferably function as the support points for the pipe to be held by the holder thus lie in the range of the minimum of the mean deflection, and this results in the least possible deflection of the pipe during measurement. As a result, the measurement result for measuring the three-dimensional shape of the pipe is optimized in an especially advantageous fashion.

In order to standardize the method according to the invention, it is recommended that the Bessel points and the maximum tolerable deviations of the supports from the Bessel points be defined so as to be able as needed to quantify and qualify standard deflections of the measured pipes.

In another preferred embodiment of the apparatus according to the invention, the pipe-shape scanner comprises at least one light source and at least one receiver for the light beams reflected by the surface of the pipe. Light sources of this type are, for example, superluminescent diodes or a white-light source whose light reflected from the pipe outer surface can be detected by a receiver. Any optical measuring device comprising a light source and a receiver can be used according to the invention. The preferred approach, however, is for the pipe-shape scanner to comprise at least one laser source and at least one laser-light detector.

This provides an apparatus that allows especially accurate means to be used to effect a high-precision measurement of the pipe shape. In addition, the measurement is performed quickly and can be integrated in a space-saving manner in the appropriate support structures.

The light source preferably projects light structures, in particular, points, lines, or patterns onto the surface of the pipe. In an especially preferred approach, these light structures can be modified locally and/or over time. The detection and analysis of the reflected light structures is then effected by a receiver, preferably one having an appropriate control and memory unit that then enables the (two-dimensional) cross-sectional shape and the (three-dimensional) shape of the pipe to be determined.

In another preferred embodiment of the apparatus according to the invention, the pipe-shape scanner comprises a frame that preferably completely surrounds the pipe perpendicular to the pipe's longitudinal orientation. An especially preferred approach here is for a plurality of light sources—preferably laser emitters—to be preferably equiangularly mounted around the circumference of the frame. A most preferred approach here is one whereby between 16 and 24 laser emitters and the same number of receivers are disposed around the circumference of the frame. As a result, using a supporting structure of relatively simple design for the individual light sources ensures that, first of all, the overall circumferential extent of the pipe can be measured simultaneously with a measurement or scanning operation, and, secondly, guarantees a reliable and continuously uniform alignment and orientation of the individual light sources relative to the pipe outer surface.

An especially preferred approach here is one where the frame is composed of individual frame segments that each hold an identical number of light sources and receivers. This allows especially simple and effective means to be used for component-by-component replacement and construction of the scanner the three-dimensional pipe shape.

A most preferred approach is one where at least one light source is movable at least radially, preferably both radially and tangentially. In particular, the light sources are movable in groups inside a respective frame segment. An especially preferred approach is one where the light sources are movable group by group inside a frame segment by appropriate actuators, thereby enabling the three-dimensional pipe-shape scanner to be effectively adjusted to the specific pipe cross-section to be scanned.

An especially preferred approach here is one where the light sources project light structures onto the surface, the light structures covering the entire circumference of the pipe to be scanned in preferably overlapping fashion so as to ensure thereby a complete and uninterrupted scan of the three-dimensional shape of the pipe. In particular, this is especially advantageously assisted by the fact that the pipe-shape scanner can be moved along the entire length of the resting pipe, where in particular, as mentioned above, the factor of any movement of the pipe that could result in measurement uncertainty and thus in an imprecise scan of the three-dimensional pipe shape is taken into account.

In another preferred embodiment of the apparatus according to the invention and of the method according to the invention, the pipe can be rotated to a predefined angular position so as to occupy, for example, a previously specified alignment of the weld seam inside the holding device—for example, the 12 o'clock or 3 o'clock position. What is especially preferred here is a rotating apparatus on the supports, for example, in the form of at least one V-roller. Also especially preferred are means for rotating the pipe about its longitudinal axis that are not connected to the holding device but that move the pipe into a predefined rotational position before the pipe rests on the supports.

In a preferred embodiment of the method according to the invention, the method utilizes the apparatus according to the invention to scan the three-dimensional shape of a pipe. The effects achieved by the method according to the invention thus correspond to those that can be achieved by using the apparatus according to the invention including its preferred embodiment.

The method according to the invention comprises the steps of holding the pipe and scanning the pipe shape, holding the pipe being done by at least one support that engages the pipe from the inside and contact-free scanning of the pipe shape is done where the pipe and the pipe-shape scanner are moved relative to each other over the entire length of the pipe.

The pipe is preferably transported by appropriate means, such as, for example, a roller assembly, to the holder for the pipe and the pipe-shape scanner, then grasped by the holder, and finally either lifted from the roller assembly or, on the other hand, held only by the holder by lowering at least segments of the roller assembly. The pipe-shape scanner then scans along the entire length of the pipe so as to thereby capture by contact-free means the three-dimensional pipe shape.

An especially preferred approach is one where prior to scanning the at least one light source, preferably the laser emitter, is positioned radially relative to the pipe outer surface inside a frame that supports the light source or sources, thereby allowing in especially preferred fashion an identical distance to be set for each light source relative to the pipe outer surface. An especially preferred approach is one where a tangential adjustment is also effected for the local position of one or more light sources such that the light source is moved essentially perpendicular to the radial positioning motion, thereby enabling a preferably equidistant alignment to be implemented for all light sources of the scanner relative to the pipe to be scanned.

An especially preferred approach is one where, when the pipe shape is scanned, the pipe rests only on the holder— preferably at the preferably previously defined points of the supports on the pipe inner surface. This ensures that a reproducible and preferably standardized method can be provided for scanning the three-dimensional pipe shape while avoiding any external effects on the measurement result.

BRIEF DESCRIPTION OF THE DRAWING

The above and other objects, features, and advantages will become more readily apparent from the following description, reference being made to the accompanying drawing in which:

FIG. 1 is a schematic side view of an apparatus according to the invention for the three-dimensional scanning of a pipe during a scanning operation;

FIG. 2 is a schematic side view of a first feed step for feeding the pipe to be scanned to an apparatus according to the invention;

FIG. 3 schematically shows a second feed step for the pipe to be scanned to an apparatus according to the invention;

FIG. 4 shows a third feed step;

FIG. 5 shows the use of the apparatus according to the invention while scanning the three-dimensional pipe shape; and FIG. 6 is an end view of the apparatus according to the invention.

DETAILED DESCRIPTION OF THE INVENTION

As seen in FIG. 1, an apparatus according to the invention for the three-dimensional scanning of a pipe 1 has feed means for moving the pipe and including two raisable and lowerable roller assemblies 11a and 11b, and two holders 2a and 2b with respective supports 4a and 4b raisable and lowerable by actuators shown schematically at 15. The holders 2a and 2b are provided so as to be movable up to the pipe 1 and then movable away from the pipe both in a first horizontal direction D (FIG. 2) parallel to a center axis A of the pipe 1 and a second horizontal direction D' (FIG. 6) perpendicular thereto. Finally, the apparatus includes for scanning the pipe shape a scanner 3 that can be moved by a drive or actuator indicated schematically at 14 longitudinally in direction D along the entire pipe 1 and is preferably shaped to scan the entire circumference of the pipe 1 that is held by the holders 2a and 2b.

FIG. 2 illustrates a first step in feeding the pipe 1 to the apparatus according to the invention. The pipe 1 is transported by raised feed-roller assemblies 11a and 11b from left to right in the direction D to between the two holders 2a and 2b, although it is also possible to transport the pipe transversely to this position. The annular scanner 3 that has already been positioned between the holders 2a and 2b is held out of the way during these operational steps, and the pipe 1 is passed through or past the essentially closed ring or frame of the scanner 3 between the holders 2a and 2b.

FIG. 3 illustrates a second step in feeding the pipe 1 to be scanned into the apparatus according to the invention. The pipe 1 is still resting on the raised roller assemblies 11a and 11b but is now centered between the holders 2a and 2b, and the holders 2a and 2b with their supports 4a and 4b lowered are each moved toward each other to the pipe 1 such that the support 4a has already been inserted into the left pipe end 1a below a predefined upper point 5a of a pipe inner surface 1c. The right-hand holder 2b, on the other hand, has not yet been moved toward the pipe 1 far enough for its support 4b to have moved into a right pipe end 1b below a predefined upper point 5b for the is support 4b. In this operational step, the scanner 3 is in a rest position at the end a certain spacing from the pipe 1.

FIG. 4 schematically illustrates the next step in feeding the pipe 1 into the apparatus according to the invention. The supports 4a and 4b of the holders 2a and 2b are in contact with the pipe inner surface 1c and are raised further so as to lift the pipe 1 off the roller assemblies 11a and 11b. At this time, the outer surface of the pipe 1 is not yet completely clear and so the pipe-shape scanner 3 stays in the rest position of FIG. 3.

FIG. 5 shows the apparatus according to the invention while the method according to the invention is being implemented, with the pipe 1 only held by the supports 4a and 4b of the holders 2a and 2b. The feed-roller assemblies 11a and 11b have been lowered to a rest position so that the pipe 1 is supported only from the inside within the apparatus and these assemblies 11a and 11b are out of the way. The scanner 3 can now be moved longitudinally back and forth between the holders 2a and 2b over the entire length of the pipe 1 in order to three-dimensionally scan and map the entire shape of the pipe 1 without touching it.

Finally, FIG. 6 shows a circularly annular frame 10 of a scanner 3 according to the invention for scanning the shape of the pipe 1. It is evident that the pipe 1 is coaxial with this round frame 10, which can be moved as desired both horizontally and also vertically to coaxially align the frame 10 with the pipe 1. Sixteen sensors 13 are disposed in equidistant fashion is relative to each other inside frame 10, with eight sensors on the axial front face and eight units the axial rear face of the frame 10.

Each of these sensors 13 includes a laser-light source and beam-shaping optics that form a laser line from the laser beam that is rendered schematically as a fan-shaped light structure 12 below each top sensor 13. Finally, each sensor 13 also comprises a detector—an image detector in the illustrated case. Individual sensors 13 are each disposed so as to be radially adjustable as shown by arrow 17 inside the frame 10 toward the pipe 1 and away from this pipe, with the result that the light structure 12 emitted by each sensor 13 covers a predefined part of the circumference of the pipe 1. Light reflected from the surface of the pipe 1 is then received by the detector associated with each sensor 13 and fed to an appropriate imaging unit 16 where the three-dimensional shape of the pipe 1 is completely reproduced. Radially directing the sensors 13, preferably laser sensors, toward the pipe 1 is preferred in order to achieve the highest possible precision of measurement since the measurement field of such sensors 13 is typically limited. At the same time, however, it is also desirable to be able to use the same equipment to measure a large range of pipe diameters.

FIG. 6 also shows that a roller may be provided to rotate the pipe 1 about its axis A, in which case the supports would need to be set up to allow such rotation while supporting the pipe 1 from inside.

We claim:
1. An apparatus for three-dimensionally imaging a pipe centered on and extending along an axis, the apparatus comprising:
a pair of axially spaced supports engageable axially into respective ends of the pipe with respective predetermined points on an inner surface of the pipe for support- ing the pipe by engagement with only the inner surface of the pipe such that an outer surface of the pipe is entirely exposed;

a scanner spacedly juxtaposed with and around the outer surface of the pipe; and means for relatively axially displacing the scanner and the pipe such that the scanner passes along a full length of the pipe for scanning of the entire outer surface.

2. The imaging apparatus defined in claim 1, wherein the points are Bessel points of the pipe.

3. The imaging apparatus defined in claim 1, wherein the scanner includes a light source and a light receiver, whereby light emitted by the source is reflected off the outer surface and received by the receiver.

4. The imaging apparatus defined in claim 3, wherein the light source is a laser emitter.

5. The imaging apparatus defined in claim 3, wherein the light source generates a light pattern against the outer surface.

6. The imaging apparatus defined in claim 5, wherein the pattern is fan shaped and lies in a plane extending radially of the pipe.

7. The imaging apparatus defined in claim 1, wherein the scanner includes an annular frame lying in a plane perpendicular to the axis and carrying a plurality of light sources angularly equispaced about the axis and radially directed at the outer surface.

8. The imaging apparatus defined in claim 7, wherein there are between 16 and 24 of the light sources.

9. The imaging apparatus defined in claim 7, wherein the light sources are radially shiftable on the frame.

10. The imaging apparatus defined in claim 1, further comprising a roller for rotating the pipe about its axis.

\* \* \* \* \*